(12) United States Patent
Hu et al.

(10) Patent No.: US 9,835,930 B2
(45) Date of Patent: Dec. 5, 2017

(54) AUTO FOCUS DEVICE AND METHOD FOR LIQUID CRYSTAL DISPLAY

(71) Applicant: International Business Machines Corporation, Armonk, NY (US)

(72) Inventors: Guo Qiang Hu, Shanghai (CN); Qi Cheng Li, Beijing (CN); Yi Min Wang, Shanghai (CN); Fang Quan Xie, Fu Zhou (CN); Bo Yang, Beijing (CN); Zi Yu Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 66 days.

(21) Appl. No.: 14/894,783

(22) PCT Filed: Apr. 11, 2014

(86) PCT No.: PCT/CN2014/075179
§ 371 (c)(1),
(2) Date: Nov. 30, 2015

(87) PCT Pub. No.: WO2014/190807
PCT Pub. Date: Dec. 4, 2014

(65) Prior Publication Data
US 2016/0109781 A1    Apr. 21, 2016

(30) Foreign Application Priority Data
May 31, 2013  (CN) .......................... 2013 1 0213867

(51) Int. Cl.
*G09G 5/00*    (2006.01)
*G02F 1/29*    (2006.01)
(Continued)

(52) U.S. Cl.
CPC ............ *G02F 1/29* (2013.01); *G02F 1/13306* (2013.01); *G06F 3/012* (2013.01); *G06F 3/013* (2013.01);
(Continued)

(58) Field of Classification Search
CPC combination set(s) only.
See application file for complete search history.

(56) References Cited

U.S. PATENT DOCUMENTS 6,147,737 A    11/2000  Yachi
6,674,505 B1    1/2004  Van De Witte et al.
(Continued)

FOREIGN PATENT DOCUMENTS

CN    1397824 A    2/2003
CN    1702487 A    11/2005
(Continued)

OTHER PUBLICATIONS

CN201310213867.0 Chinese Office Action dated Jun. 14, 2016.
(Continued)

*Primary Examiner* — Jennifer Mehmood
*Assistant Examiner* — Sosina Abebe
(74) *Attorney, Agent, or Firm* — Scully, Scott, Murphy & Presser, P.C.; David M. Quinn, Esq.

(57) ABSTRACT

An auto focus device comprises a focus panel and a focus controller. The focus panel comprises liquid crystal between a first light-transmissive conductive film and a second light-transmissive conductive film, and the focus controller is configured to apply a voltage between the two light-transmissive conductive films at the position of at least one pixel, so that the liquid crystal at the position will have an expected focal length. An auto focus method comprises: acquiring information on eyesight status of a user; acquiring information on posture of the user; calculating expected (Continued)

focal length of the liquid crystal between the two light-transmissive conductive films at the position of at least one pixel according to the acquired user information; selecting a voltage to be applied between the two light-transmissive conductive films at the position according to the expected focal length; and applying the voltage between the two light-transmissive conductive films at the position.

13 Claims, 7 Drawing Sheets

(51) Int. Cl.
G02F 1/133 (2006.01)
G06F 3/01 (2006.01)
G06F 3/0482 (2013.01)
G06F 3/0484 (2013.01)
G09G 3/36 (2006.01)

(52) U.S. Cl.
CPC ........ *G06F 3/0482* (2013.01); *G06F 3/04842* (2013.01); *G06F 3/04847* (2013.01); *G09G 3/36* (2013.01); *G02F 2001/294* (2013.01); *G09G 2320/08* (2013.01); *G09G 2354/00* (2013.01)

(56) References Cited

U.S. PATENT DOCUMENTS

| | | | |
|---|---|---|---|
| 6,680,762 | B2 | 1/2004 | Fukuda et al. |
| 7,910,868 | B2 | 3/2011 | Suzuki et al. |
| 8,225,229 | B2 | 7/2012 | Thorn et al. |
| 2008/0002262 | A1 | 1/2008 | Chirieleison |
| 2010/0321788 | A1 | 12/2010 | Wang et al. |
| 2012/0195519 | A1 | 8/2012 | Horikawa |
| 2014/0152926 | A1* | 6/2014 | Takahashi .......... G02B 27/2214 349/15 |

FOREIGN PATENT DOCUMENTS

| | | |
|---|---|---|
| CN | 101010611 A | 9/2007 |
| CN | 201251647 Y | 6/2009 |
| CN | 201937710 U | 8/2011 |
| CN | 102522072 A | 6/2012 |
| CN | 102692744 A | 9/2012 |
| CN | 102944960 A | 2/2013 |
| GE | WO 2011/156721 A1 | 12/2011 |
| JP | 10268305 A2 | 10/1998 |
| JP | 2012113250 A | 6/2012 |
| WO | WO 2009/136667 A1 | 12/2009 |

OTHER PUBLICATIONS

CN201310213867.0 Chinese Office Action Search Report dated May 30, 2016.
PCT/CN2014/075179 International Search Report dated Jul. 18, 2014.
Anonymous, "Method for Automatically Adjusting Screen and Content Brightness for Optimal Visual Acuity", IP.com Prior Art Database, IP.com No. IPCOM000213352D, Dec. 13, 2011.
Pamplona et al. "NETRA: Interactive Display for Estimating Refractive Errors and Focal Range", Research Gate, Jan. 2010.
Taherkhani et al., "Designing a High Accuracy 3D Auto Stereoscopic Eye Tracking Display, using a Common LCD Monitor", 3D Research Center, Kwangwoon University and Springer, 2012, Received Oct. 19, 2011, Revised Dec. 18, 2011, Accepted Feb. 15, 2012.

* cited by examiner

AUTO FOCUS DEVICE AND METHOD FOR LIQUID CRYSTAL DISPLAY

BACKGROUND OF THE INVENTION

The present invention relates to improvement of the liquid crystal display and, in particular, to liquid crystal display adapted to presbyopic users.

Many people suffer from presbyopia with aging. This is because, due to the sclerosis of the crystalline lens, the weakening of its elasticity and loss of power of the ciliary muscles, the eye's adjustment ability is progressively diminished, causing the imaging of close range objects to lie behind the retina. To assist close range reading, presbyopic patients usually use presbyopic glasses and/or magnifying glass to change the angle of light propagation and "pull" the imaging of close range objects back to the retina to catch a clear view of the objects.

In the past, reading materials for close range reading were usually books and newspapers, etc. Now, they are being gradually replaced by computer displays, mobile phone screens, etc. There are increased opportunities for temporary close range reading (e.g. viewing/dialing mobile phones). It is very inconvenient to wear spectacles or holding a magnifying glass to conduct close range reading.

There exist techniques for assisting presbyopic users to improve their reading experience. For example, some methods propose to capture the external object with the camera of the mobile phone and then enlarge the image in the mobile phone so as to facilitate the presbyopic user to view it. Some methods propose to pretreat the image to filter out unimportant information and highlight key features so as to improve the visibility of specific information. However, these methods can not fundamentally solve the issue of imaging away from the retina.

SUMMARY OF THE INVENTION

One of the objectives of the invention is to improve the conventional liquid crystal display (LCD) to enable imaging of the content of LCD right onto the retina of the presbyopic user.

In one aspect, it is provided an auto focus device for liquid crystal display comprising a focus panel and a focus controller, wherein the focus panel comprises a first light-transmissive conductive film, a second light-transmissive conductive film and liquid crystal between the first light-transmissive conductive film and the second light-transmissive conductive film; and wherein the focus controller is configured to apply a voltage between the first light-transmissive conductive film and the second light-transmissive conductive film at the position of at least one pixel, so that the liquid crystal at the position of the at least one pixel will have an expected focal length.

In another aspect, it is provided a liquid crystal display comprising a liquid crystal imaging panel and an auto focus device as mentioned above, wherein the auto focus device has a focus panel which is disposed on a surface of the liquid crystal imaging panel.

In still another aspect, it is provided an auto focus method for the liquid crystal display as mentioned above, comprising: acquiring information on eyesight status of a user; acquiring information on posture of the user; calculating expected focal length of the liquid crystal between the first light-transmissive conductive film and the second light-transmissive conductive film at the position of at least one pixel according to the information on eyesight status and the information on posture of the user; selecting a voltage to be applied between the first light-transmissive conductive film and the second light-transmissive conductive film at the position of the at least one pixel according to the expected focal length; and applying the voltage between the first light-transmissive conductive film and the second light-transmissive conductive film at the position of the at least one pixel.

DETAILED DESCRIPTION some preferred embodiments will be described in more detail with reference to the accompanying drawings, in which the preferred embodiments of the present disclosure are illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
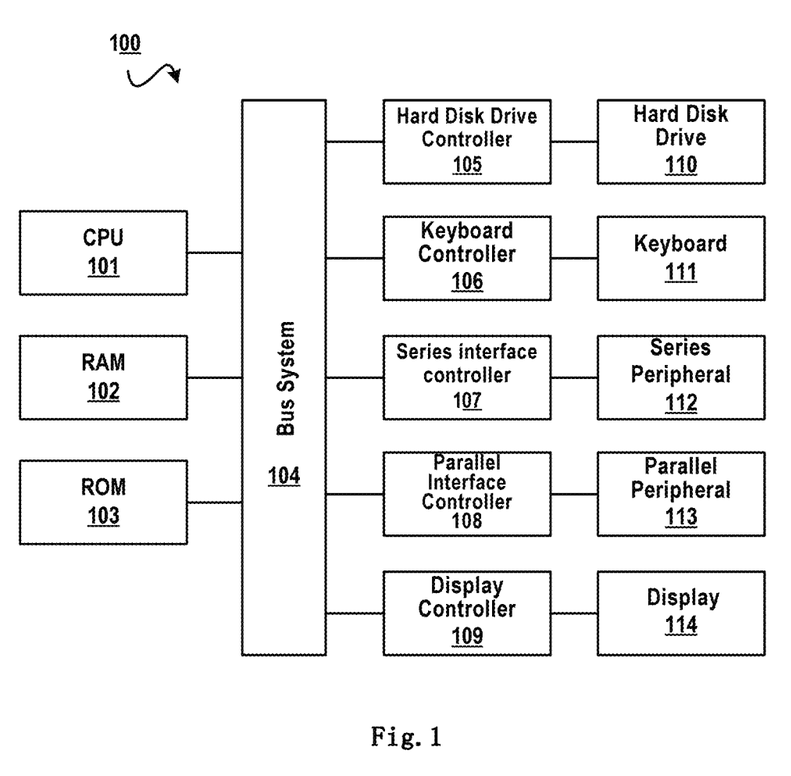
FIG. 1 shows a block diagram of an illustrative computer system 100 adapted to implement embodiments of the present invention.

FIG. 1 shows a block diagram of an illustrative computer system 100 adapted to implement embodiments of the present invention. As shown in FIG. 1, the computer system 100 can include a CPU (central processing unit) 101, a RAM (random access memory) 102, a ROM (read only memory) 103, a system bus 104, a hard disk controller 103, a keyboard controller 106, a serial interface controller 107, a parallel interface controller 108, a display controller 109, a hard disk 110, a keyboard 111, a serial external device 112, a parallel external device 113 and a display 114. Among these devices, connected to the system bus 104 are the CPU 101, the RAM 102, the ROM 103, the hard disk controller 105, the keyboard controller 106, the serial controller 107, the parallel controller 108 and the display controller 109. The hard disk 100 is coupled to the hard disk controller 105, the keyboard 111 is coupled to the keyboard controller 106, the serial external device 112 is coupled to the serial interface controller 107, the parallel external device 113 is coupled to the parallel interface controller 108, and the display 114 is coupled to the display controller 109. It should be understood that, the structural block diagram shown in FIG. 1 is illustrated for the purpose of example, and not a limitation to the scope of the present invention. In some cases, some devices can be added or removed from the structural diagram shown in FIG. 1 depending on specific cases.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or apparatus, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage apparatus, a magnetic storage apparatus, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other apparatus to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other apparatus to cause a series of operational steps to be performed on the computer, other programmable apparatus or other apparatus to produce a computer implemented process such that the instructions which execute on the computer or other programmable apparatus provide processes for implementing the functions/acts specified in the flowchart and/or block diagram block or blocks.

The computer system 100 shown in FIG. 1 may be used to implement the control as well as the acquisition, computation and storage of data involved in the invention. The display 114 in the computer system 100 may be implemented with the LCD of the present invention.

The general idea of the invention is to deploy an auto focus device in the conventional LCD to facilitate the presbyopic user to view the content rendered on the LCD.

Figure 2:
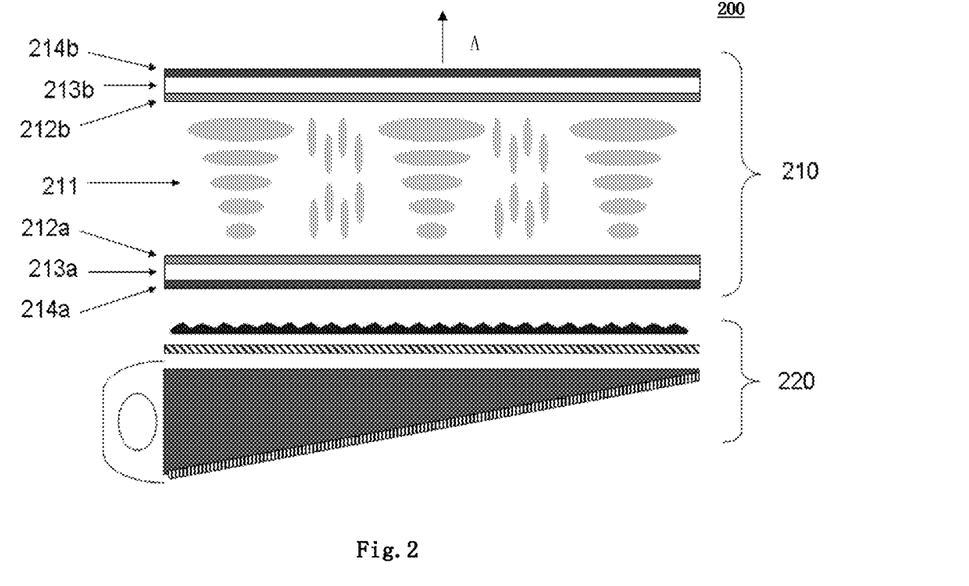
FIG. 2 schematically shows a partial structure of an example of the conventional LCD.

Refer to FIG. 2, which schematically shows a partial structure of an example of the conventional LCD 200.

The LCD 200 shown in FIG. 2 mainly comprises a liquid crystal imaging panel (briefly referred to as "imaging panel") 210 and a backlight module 220, wherein the back light module 220 provides the light source for the liquid crystal imaging panel 210.

The imaging panel comprises liquid crystal 211, alignment films 212a and 212b, glass substrates 213a and 213b, and polarizer 214a and 214b.

The incident light from the backlight module 220, due to the effect of the polarizer 214a, enters into liquid crystal 211 in a direction perpendicular to the polarizer 214a. The voltage corresponding to each pixel that is applied between the alignment films 212a and 212b control the rotation direction of the liquid crystal at the pixel. The light entering liquid crystal 211 via the polarizer 214a can only pass through the liquid crystal that is perpendicular to the polarizer 214b and arrive at the polarizer 214b; the polarizer 214b only allows the light perpendicular to the polarizer 214b to pass through, thereby generating the visible light A.

A control module (not shown) in the LCD 200 controls the imaging of the LCD, namely, on- or off-states of individual pixels and the color at each pixel. When the electricity is turned off, the screen of the LCD 200 is black. The control module adjusts the degree of rotation of the liquid crystal at each pixel by adjusting the voltage corresponding to the pixel to be applied between the alignment films 212a and 212b, thereby controlling the direction of the light passing through the liquid crystal and cause the light of expected luminous pixel to be perpendicular to the polarizer 214b.

The principle of imaging of the conventional LCD 200 is briefly described above. As imaging of the conventional LCD in more detail falls into the scope of the prior art, it shall not be further described herein.

Figure 3:
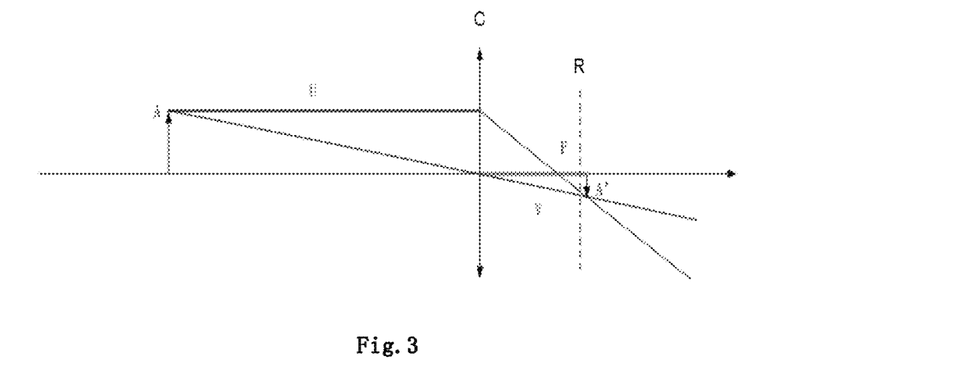
FIG. 3 schematically shows an optical path diagram when the presbyopic user is using the conventional LCD.

FIG. 3 schematically shows an optical path diagram when the presbyopic user is using the LCD 200 as shown in FIG. 2. In FIG. 3, it is shown a horizontal axis and a convex lens (hereinafter also referred to as "lens") C. The horizontal axis represents the direction of the light, and the lens C represents the lens of the user's eye. And a dotted line R represents the position of the retina. FIG. 3 shows the focal length F of the lens C, the object distance U and the image distance V, their relationship satisfying the following Formula (1).

$$1/F = 1/U + 1/V \qquad \text{Formula (1)}$$

FIG. 3 also shows the visible light A emitted from the LCD 200 and its image A' generated after it passes through the lens. As shown, the image A' of the light A falls behind the retina R rather than just on the retina R. This means that the presbyopic user can not clearly see the content displayed on LCD 200.

Embodiments of the invention will be illustrated below with reference to drawings.

Generally speaking, the invention proposes to incorporate focusing function into conventional displays by setting a focusing device, without any change to the mode of imaging of the conventional LCD.

Figure 4A:
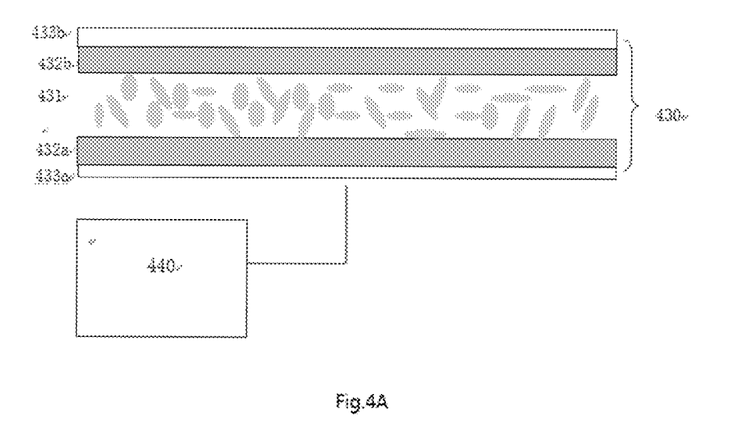
FIG. 4A schematically shows an auto focus device according to an embodiment of the invention.

Refer to FIG. 4A, which schematically shows an auto focus device according to an embodiment of the invention. The auto focus device shown in FIG. 4A comprises a focus panel 430 and a focus controller 440.

The focus panel 430 comprises a first light-transmissive conductive film 432a, a second light-transmissive conductive film 432b, and liquid crystal 431 between the first light-transmissive conductive film and the second light-transmissive conductive film.

According to an embodiment of the invention, the light-transmissive conductive films may be made of indium tin oxide (ITO).

The focus controller is configured to apply a voltage between the first light-transmissive conductive film and the second light-transmissive conductive film at the position of at least one pixel, so that the liquid crystal at the position of the at least one pixel will have an expected focal length.

For convenience of description, the operation of the auto focus device will be illustrated by describing a LCD comprising the auto focus device shown in FIG. 4A.

Figure 4B:
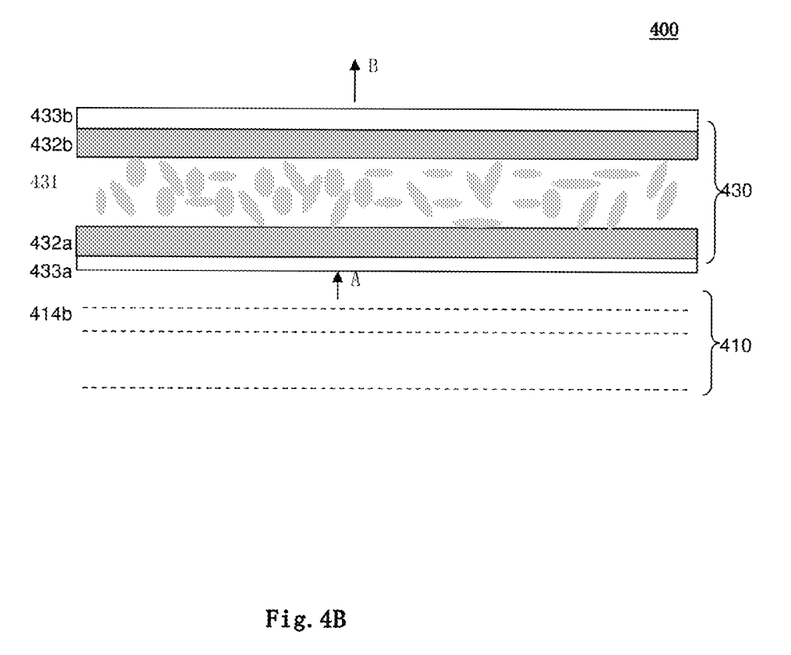
FIG. 4B schematically shows a partial structure of the LCD according to an embodiment of the present invention.

Refer to FIG. 4B, which schematically shows a partial structure of the LCD 400 according to an embodiment of the invention. The LCD 400 comprises a liquid crystal imaging panel 410 and an auto focus device as shown in FIG. 4A. For brevity, FIG. 4B only shows the focus panel 430 of the auto focus device. The focus controller of the auto focus device is not shown.

As shown in the figure, the focus panel 430 of the auto focus device is disposed at the surface of the imaging panel 410.

As mentioned above, FIG. 4B shows the LCD 400 according to an embodiment of the invention. In this case, the imaging panel 410 may be the liquid crystal imaging panel 210 as shown in FIG. 2. The surface of the imaging panel 410 is a polarizer 414b. The position and the function of the polarizer 414b in the imaging panel 410 may be the same as the position and the function of the polarizer 214b in the imaging panel 210.

Accordingly, in accordance with an embodiment of the invention, a first light-transmissive conductive film of the focus panel is disposed on the polarizer 414b of the liquid crystal imaging panel.

According to an embodiment of the invention, the focus panel further comprises a glass substrate 433b on a second light-transmissive conductive film 432b.

In addition, the focus panel may further comprise a glass substrate 433a between the first light-transmissive conductive film 432a and the polarizer 414b.

As will be appreciated by one skilled in the art, the glass substrate plays a role in fixing the light-transmissive conductive film. So there is no need to describe it in more detail herein.

According to the structure described above, the focus panel 430 disposed on the surface of the imaging panel 410 receives light A from imaging panel 410 at one side and emits visible light B at the other side.

The light source of the focus panel 430 is the light A emitted from the polarizer 414b of the liquid crystal imaging panel.

By applying voltages to electrodes between the first light-transmissive conductive film and the second light-transmissive conductive film at individual pixels, the focus controller may control the refractive index of liquid crystal between the first light-transmissive conductive film and the second light-transmissive conductive film at any pixel, thereby causing the liquid crystal at the position of at least one pixel to have an expected focal length.

The refractive index of liquid crystal, also referred to as "transmission-refractive index", indicates the degree of change of direction of the light passing through a liquid crystal body. The liquid crystal body may experience different degrees of rotation in response to different voltages applied to it, demonstrating different refractive indexes. By adjusting the value of the refractive index of liquid crystal between the first light-transmissive conductive film and the second light-transmissive conductive film according to expectation, the light A will change direction as it passes through the focus panel.

Figure 5:
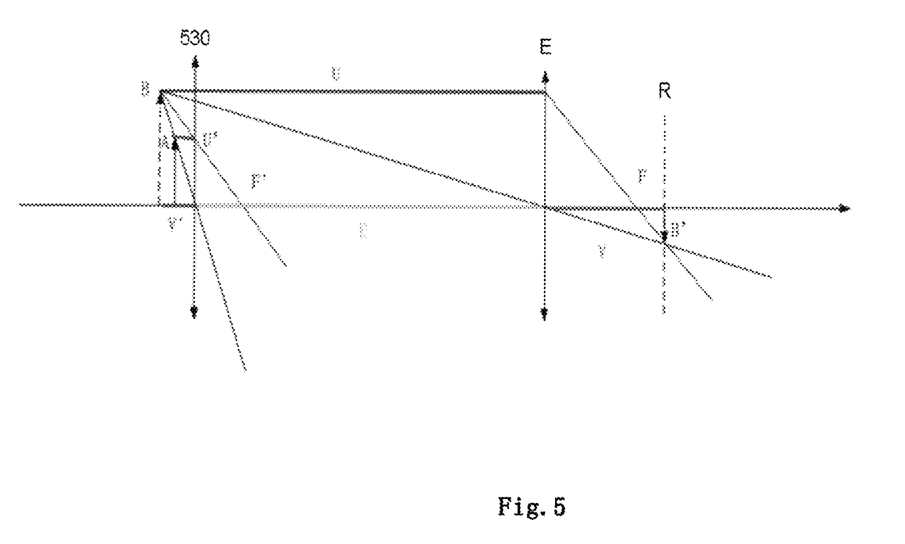
FIG. 5 schematically shows an optical path diagram when the presbyopic user is using the LCD shown in FIG. 4B.

Refer to FIG. 5, which shows an optical path diagram depicting the situation that a presbyopic user is viewing the LCD 400 as shown in FIG. 4B. FIG. 5 shows a horizontal axis and two convex lenses. The horizontal axis represents the direction of light. The lens 530 on the left side represents the liquid crystal at a pixel in the focus panel 430 shown in FIG. 4. The symbol B represents the virtual image of light A generated as a result of the effect of the lens 530. The relationship of the focal length F' of the lens 530, the object distance U' and the image distance V' satisfies the following Formula (2):

$$1/F' = 1/U' + 1/V' \qquad \text{Formula (2)}$$

wherein the object distance U' is the distance between the focus panel 430 and the imaging panel 410.

The convex lens C on the right side represents the lens of the presbyopic user's eye, the dotted line R indicates the position of the retina. The relationship of the focal length F of the lens C, the object distance U and the image distance U satisfies Formula (1) mentioned above.

Under the control of the voltage applied by the focus controller 440, the liquid crystal at the pixel has an expected refractive index, leading to an expected focal length F' of the lens 530. The virtual image B generated from the light A due to the effect of the lens 530 is equivalent to the object of the lens C. After it passes through the lens C, the image B' is generated just at the retina R.

The distance E between the lens C and the lens 530 is just the distance between the presbyopic user's eye and the focus panel 430. The relationship of the distance E with the image distance V' and the object distance U satisfies the following Formula (3):

$$U=E+V' \quad \text{Formula (3)}$$

Figure 6:
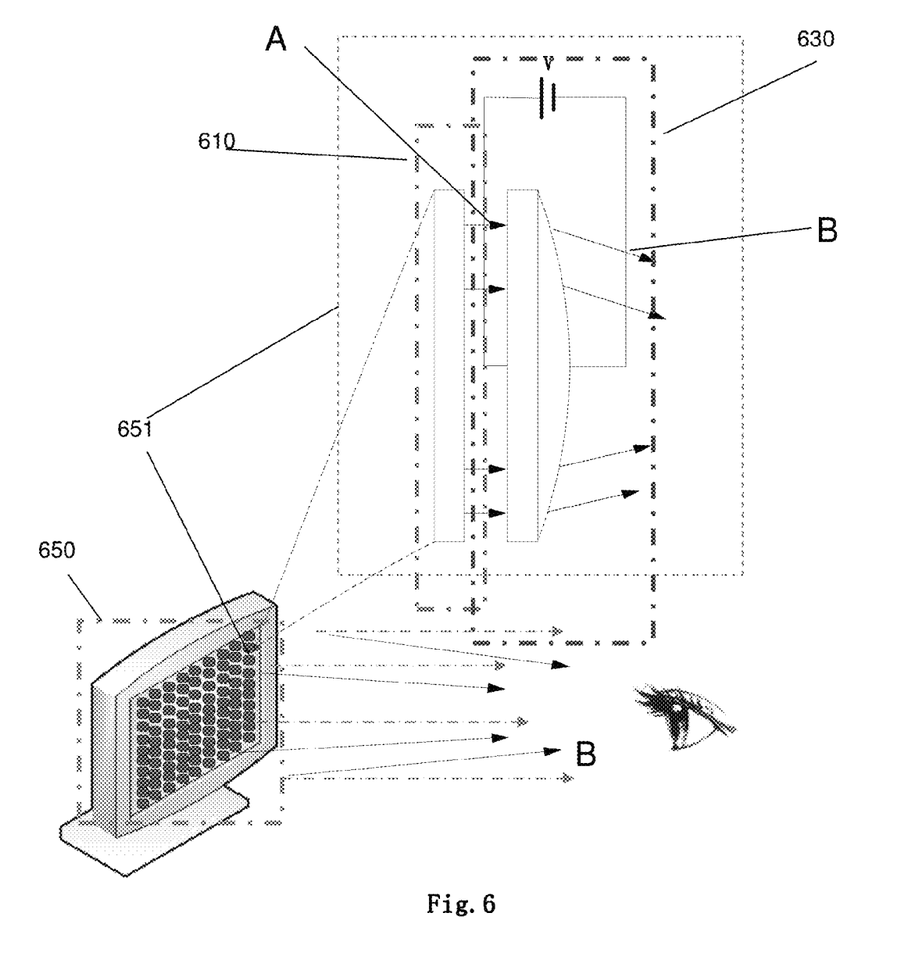
FIG. 6 illustratively depicts the displaying effect of the LCD according to an embodiment of the invention.

Refer to FIG. 6, which illustratively depicts the displaying effect of the LCD according to an embodiment of the invention. As shown in the figure, the pixel array 650 of the LCD comprises a plurality of pixels 651. The upper part in the figure is a magnified representation of one pixel 651. As shown in the figure, the imaging panel 610 at the pixel 651 corresponds to a part of the imaging panel 410 as shown in FIG. 4, and the focus panel 630 corresponds to a part of the focus panel 430 as shown in FIG. 4. As shown, under the control of a voltage v applied, based on expectation, between the first light-transmissive conductive film and the second light-transmissive conductive film of the focus panel 430 at the pixel 651, the light A, which is emitted from the imaging panel 610 in a direction perpendicular to the display screen, will pass through the focus panel 430 and become the light B in a changed direction. The image B' of the light B will fall onto the retina R of the presbyopic user who is viewing the LCD as desired (see FIG. 5).

As will be appreciated by one skilled in the art, for a particular presbyopic user, if the eyesight status, for example, the presbyopic degree, can be determined, then the focal length F of the eye's lens C may be determined. Since it belongs to the category of existing techniques, there is no need to describe it in more detail herein. Based on Formula (1) on lens C, it may be known that, given a definite focus F, whether the image B' of the light B will fall onto the retina R depends on the value of the object distance U of the light B.

If the distance E between the user's crystalline lens and the focus panel 430 is definite, it may be known from Formula (3) that the value of the object distance U depends on the value of the image distance V'. Because the object distance U' of the lens 530 is definite, it may be further known from Formula (2) that the value of the image distance V' is dependent upon the value of the focal length F.

In summary, whether the image B' of the light B will fall on the retina R is dependent on the user's eyesight status, the position of the focus panel 430 and the focal length F' of the lens. In the circumstance that the user's eyesight status and the position of the focus panel 430 are definite, whether the image B' of the light B will fall onto the retina R is dependent on the value of the focal length F'.

In the specification, the focal length F' that would cause the image B' of the light B to fall onto the retina R is referred to as "expected focal length".

According to an embodiment of the invention, the focus controller is configured to select a voltage to be applied between the first light-transmissive conductive film and the second light-transmissive conductive film at the position of at least one pixel based on the expected focal length of the liquid crystal at the position of the at least one pixel.

Those skilled in the art shall appreciate that there is a definite relationship between a voltage to be applied between the first light-transmissive conductive film and the second light-transmissive conductive film at the position of a pixel and the focal length of the liquid crystal at the position. Thus, according to the inventive concept, in the circumstance that the expected focal length at the position is known, the voltage corresponding to the expected focal length may be obtained. By applying the corresponding voltage at the position, it is able to cause the liquid crystal at the position to have the expected focal length.

Refer to FIG. 6. The pixel 651 shown in FIG. 6 comprises the focus panel 630 consisting of a first light-transmissive conductive film, a second light-transmissive conductive film and liquid crystal. When a voltage v is applied between the first light-transmissive conductive film and the second light-transmissive conductive film, the refractive index of the pixel 651 for the incident light A is $\delta$.

The relationship of the focal length F' of the pixel 651 and the refractive index $\delta$ is expressed by the following Formula (4):

$$F'=r^2/(2d\delta) \quad \text{Formula (4)}$$

wherein r is the radius of the pixel and d is the thickness of the liquid crystal.

For a focus panel with definite physical characteristics (such as material and structure), its refractive index under the action of a specified voltage is definite and may be measured in advance.

Figure 7:
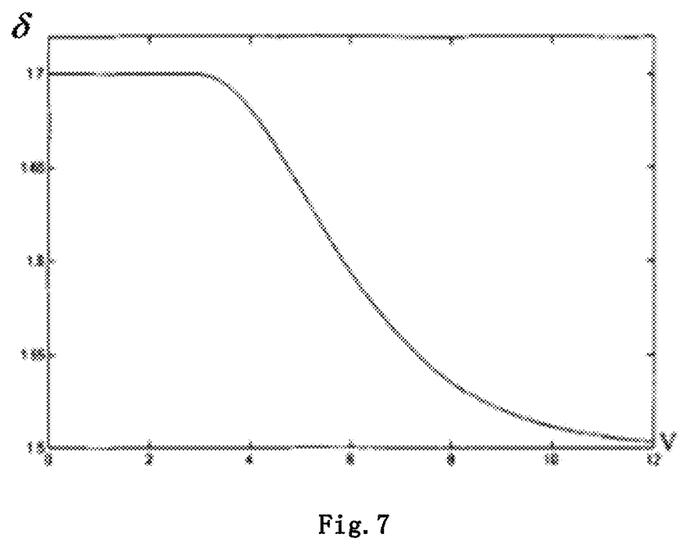
FIG. 7 schematically shows the relationship between the refractive index of the focus panel and the applied voltage in accordance with an embodiment of the invention.

On the other hand, for the focus panel with definite physical characteristics, when a voltage v is applied between its first light-transmissive conductive film and second light-transmissive conductive film, the refractive index $\delta$ is a function of the voltage v, as illustrated by FIG. 7.

FIG. 7 schematically shows the relationship between the refractive index of a focus panel and the applied voltage in accordance with an embodiment of the invention. In FIG. 7, the scale on the horizontal axis represents the value of the voltage v and the scale on the vertical axis represents the value of the refractive index $\delta$. The curve in the figure shows that the refractive index $\delta$ is a function of the voltage v.

In other words, there is predefined mapping relationship between the refractive index $\delta$ and the voltage v, which may be represented by a refractive index-voltage mapping table as following.

TABLE 1

| Refractive index-voltage mapping table | | |
| --- | --- | --- |
| No. | Refractive index ($\delta$) | Voltage (v) |
| 1 | $\delta_1$ | $v_1$ |
| 2 | $\delta_2$ | $v_2$ |
| ... | ... | ... |
| i | $\delta_i$ | $v_i$ |
| ... | ... | ... |

For example, the i-th row in Table 1 indicates that the corresponding voltage of the refractive index $\delta_i$ is $v_i$.

According to Table 1 and Formula (4), the mapping relationship between the focal length F' and the voltage may be calculated, as shown in the following Table 2.

TABLE 2

Focal length-voltage mapping table

| No. | Focal length (F') | Voltage (v) |
|-----|-------------------|-------------|
| 1   | $F'_1$            | $v_1$       |
| 2   | $F'_2$            | $v_2$       |
| ... | ...               | ...         |
| j   | $F'_j$            | $v_j$       |
| ... | ...               | ...         |

For example, the j-th row in Table 2 indicates that the corresponding voltage of the focal length $F'_j$ is $v_j$.

From the description above it may be seen that the focal length-voltage mapping relationship shown in Table 2 is determined by the physical characteristics of the focus panel and may be calculated in advance. Thus, in implementing the invention, the data of a variety of possible focal length-voltage mapping relations as shown in Table 2 may be calculated and stored in advance, thereby reducing the amount of calculations in real time.

According to an embodiment of the invention, the focus controller selects a voltage corresponding to the expected focal length from a focal length-voltage mapping table stored in advance as the voltage to be applied.

As mentioned above, in the circumstance that the user's eyesight status and the position of the focus panel 430 are definite, the expected focal length of the liquid crystal at any pixel in the focus panel 430 can be calculated. By looking up Table 2, the voltage value corresponding to the expected focal length may be determined.

In practice, voltage values corresponding to individual pixels in the pixel array of the display may be determined in the same manner. By simultaneously applying the voltages according to these voltage values to the electrodes between the first light-transmissive conductive film and the second light-transmissive conductive film at individual pixels respectively, full image of the LCD may be clearly caught by the presbyopic user.

According to an embodiment of the invention, the focus controller is configured to select the voltage to be applied in response to a focus calculating device providing it with the expected focal length.

According to an embodiment of the invention, the focus calculating device is configured to calculate the expected focal length of the liquid crystal at the position of each pixel in the focus panel according to information on a user's eyesight status and information on the user's posture, and to provide the expected focal length calculated to the focus controller.

The focus calculating device may calculate the expected focal length for liquid crystal at any pixel in the focus panel 430 according to Formula (1), Formula (2) and Formula (3) described above.

For example, based on the information on the user's eyesight status, the value of the focal length F in Formula (1) may be determined. Based on the information on the user's posture, the distance between the user's eye and a particular pixel (for example the central pixel) of the focus panel 430 may be determined, which is the distance E of Formula (3). Based on Formula (1), (2) and (3), the expected focal length F' of the liquid crystal at the pixel may be calculated.

In the circumstance that the distance between the user's eye and the particular pixel has been determined, since the distance between any of other pixels and the particular pixel is known, the distance between the user's eye and each of the other pixels in the pixel matrix may be calculated according to the Pythagorean theorem. Thus, the expected focal length of the liquid crystal at each pixel may be calculated in the similar manner.

The focal calculating device may provide the focus controller with individual focal lengths calculated.

According to an embodiment of the invention, when there is change in the information of the user's posture, the focus calculating device will re-calculate the expected focal length and provide the expected focal length re-calculated to the focus controller.

The expected focal length for liquid crystal at each pixel may be recalculated and then provided to the focus controller in the same manner. Thus, when there is change in the user's posture, the focus controller is enabled to automatically adjust the voltages applied between the first light-transmissive conductive film and the second light-transmissive conductive film at individual pixels in a timely manner, thereby maintaining sharpness of the LCD's image.

According to an embodiment of the invention, the focus calculating device may obtain the information on the user's eyesight status and the information on the user's posture from a user information detecting device. The user information detecting device is configured to acquire the information on the user's eyesight status and the information on the user's posture via human-machine interactions.

For example, the user's current face image may be captured through a built-in or attached camera of a smart device, and the distance and direction of the user's eyes relative to the LCD of the smart device is further identified and saved as the information on the user's posture at the present time. When the user's posture is changed, the information on the user's posture will be updated immediately.

For example, when the user turns on the LCD of a smart device (such as computer, smart phones or smart television), a message is displayed on the screen prompting the user to input her/his presbyopic degree, or a list of presbyopic degrees is displayed on the screen from which the user may make a choice. Thereby the presbyopic degree of the current user may be obtained and saved as the information on eyesight status of the current user.

In addition, an adjustment button may be provided on the screen of the display. The user may adjust the sharpness of the screen by pressing the button, until the screen becomes sharp. By analyzing the state of the adjustment button and the user's posture at the present time, the information on eyesight status of the current user may be derived.

Embodiments of the auto focus device and the display comprising the auto focus device of the invention have been described above. Those skilled in the art shall appreciate that the auto focus device of the invention may be implemented on ordinary computers as well as other devices equipped with computing capabilities—such as, but not limited to—tablet computers, mobile phones, televisions, etc.

According to the same inventive concept, the invention also provides a method of using the display comprising the auto focus device comprising.

Figure 8:
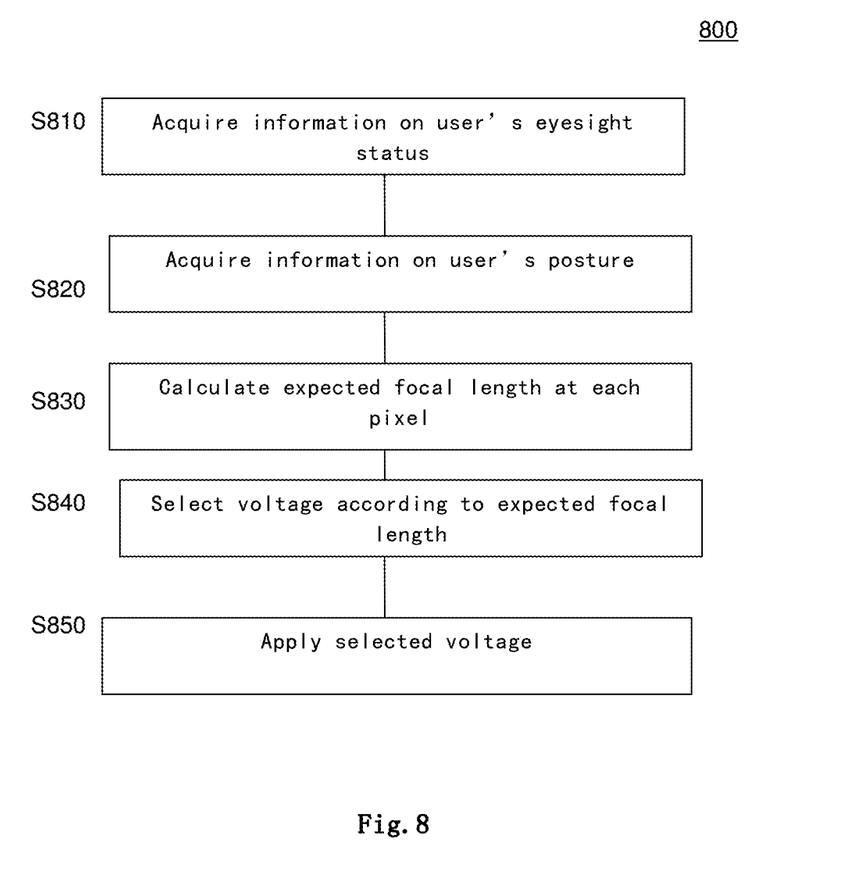
FIG. 8 schematically shows a high level flowchart of an auto focus method for LCD according an embodiment of the invention.

Refer to FIG. 8, in which a high level flowchart of an auto focus method for a liquid crystal display comprising an auto focus device according an embodiment of the invention is shown. The method 800 shown in FIG. 8 may start when a user turns on the display, mainly comprising the following steps:

In Step S810, information on eyesight status of the user is acquired.

In Step S820, information on posture status of the user is acquired.

In Step S830, expected focal length of the liquid crystal between the first light-transmissive conductive film and the second light-transmissive conductive film at the position of at least one pixel is calculated according to the information on eyesight status and the information on posture of the user.

In Step S840, a voltage to be applied between the first light-transmissive conductive film and the second light-transmissive conductive film at the position of the at least one pixel is selected according to the expected focal length; and In Step S850, the voltage is applied between the first light-transmissive conductive film and the second light-transmissive conductive film at the position of the at least one pixel.

According to an embodiment of the present invention, in Step S810, the information on eyesight status of the user comprises the user's presbyopic degree; the information on posture of the user comprises the direction and distance of the user's eye relative to the liquid crystal display. As described in previous paragraphs, the focal length F of the eye pupil may be determined based on the presbyopic degree (FIG. 3) and the distance E between the eye pupil and each pixel may be determined based on the direction and distance of the eye relative to the LCD (FIG. 3).

According to an embodiment of the invention, Step S830 may comprise selecting a voltage corresponding to the expected focal length from a focal length-voltage mapping table stored in advance. The manner of obtaining the focal length-voltage mapping table has been described in previous paragraphs. By selecting the voltage corresponding to the expected focal length from the focal length-voltage mapping table, the amount of calculation required during the operation of the display may be reduced.

According to an embodiment of the invention, Step S810 may comprise prompting the user to input a presbyopic degree on the display, and receiving the presbyopic degree inputted by the user.

According to an embodiment of the invention, Step S810 may comprise displaying options representing different presbyopic degrees on the display for the user to select and receiving the user's selection of one of the options.

According to an embodiment of the invention, Step S820 may comprise acquiring the user's current face image through a camera device on the display and then further identifying distance and direction of the user's eyes relative to the display.

Various embodiments of the auto focus method for a liquid crystal display comprising an auto focus device of the invention are described above. Since various embodiments of the auto focus device and the LCD comprising the auto focus device of the invention have been described in detail above, in the description of the various embodiments of the auto focus method, details that are repetitive or derivable from the description of the various embodiments the auto focus device and the LCD comprising the auto focus device are omitted here.

With the liquid crystal display and the auto focus method of the invention, it is enabled to capture posture changes of the presbyopic user who is viewing the display, update the expected focal length of the liquid crystal at each pixel in the focus panel in a timely manner and automatically adjust the focus-adjusting voltage accordingly, so as to adjust the focal length of the liquid crystal at each pixel in the focus panel and enable the user to clearly view the content on the display.

The flowcharts and blocks in the figures illustrate the system, methods, as well as architecture, functions and operations executable by a computer program product according to embodiments of the present invention. In this regard, each block in the flowcharts or block may represent a module, a program segment, or a part of code, which contains one or more executable instructions for performing specified logic functions. It should be noted that, in some alternative implementations, the functions noted in the blocks may also occur in a sequence different from what is noted in the drawings. For example, two blocks shown consecutively may be performed in parallel substantially or in an inverse order. This depends on relevant functions. It should also be noted that each block in the block diagrams and/or flowcharts and a combination of blocks in the block diagrams and/or flowcharts may be implemented by a dedicated hardware-based system for performing specified functions or operations or by a combination of dedicated hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An auto focus device for a liquid crystal display comprising a focus panel (430) and a focus controller (440), wherein the focus panel (430) comprises:
   a first light-transmissive conductive film (432a);
   a second light-transmissive conductive film (432b); and
   liquid crystal (431) between the first light-transmissive conductive film and the second light-transmissive conductive film, and
   a focus calculating device configured to calculate an expected focal length of the liquid crystal at a position of each pixel in the focus panel according to information on a user's eyesight status and information on the user's posture, and to provide the calculated expected focal length to the focus controller (440);
   wherein the focus controller (440) is configured to select and apply a voltage between the first light-transmissive conductive film and the second light-transmissive conductive film at the position of at least one pixel in response to receiving the calculated expected focal length, so that the liquid crystal at the position of the at least one pixel will have the expected focal length.

2. The auto focus device of claim 1, wherein the focus controller is configured to select a voltage corresponding to the expected focal length from a pre-stored focal length-voltage mapping table as the voltage to be applied.

3. The auto focus device of claim 1, wherein the focus calculating device is configured to re-calculate the expected focal length when there is change in the information on the user's posture, and provide the expected focal length re-calculated to the focus controller.

4. The auto focus device of claim 1, wherein the focus calculating device is configured to obtain the information on the user's sight status and information on the user's posture from a user information detecting device, the user information detecting device being configured to acquire the information on the user's sight status and information on the user's posture through human-machine interaction.

5. A liquid crystal display (400) comprising a liquid crystal imaging panel (410) and the auto focus device of claim 1, wherein the auto focus device has a focus panel disposed on a surface of the liquid crystal imaging panel.

6. The liquid crystal display of claim 5, wherein the first light-transmissive conductive film of the focus panel is disposed on a polarizer (414*b*) of the liquid crystal imaging panel.

7. The liquid crystal display of claim 6, further comprising:
   a glass substrate(433*b*) disposed on the second light-transmissive conductive film of the focus panel.

8. An auto focus method for a liquid crystal display device, the liquid crystal display device comprising a focus panel (430) and a focus controller (440), the focus panel (430) comprising:
   a first light-transmissive conductive film (432*a*);
   a second light-transmissive conductive film (432*b*);
   a liquid crystal (431) between the first light-transmissive conductive film and the second light-transmissive conductive film, and said method comprising:
   acquiring, at a focus calculating device, the information on eyesight status of a user;
   acquiring, at the focus calculating device, the information on a posture of the user;
   calculating, at the focus calculating device, an expected focal length of the liquid crystal between the first light-transmissive conductive film and the second light-transmissive conductive film at a position of at least one pixel according to the information on eyesight status and the information on posture of the user;
   providing the calculated expected focal length to a focus controller (440);
   selecting, by the focus controller, a voltage to be applied between the first light-transmissive conductive film and the second light-transmissive conductive film at the position of the at least one pixel according to the expected focal length; and
   applying, by the focus controller, the voltage between the first light-transmissive conductive film and the second light-transmissive conductive film at the position of the at least one pixel.

9. The auto focus method according to claim 8, wherein the information on eyesight status of the user comprises the presbyopic degree of the user, and the information on posture of the user comprises the direction and distance of the user's eyes relative to the liquid crystal display.

10. The auto focus method according to claim 9, wherein said selecting a voltage to be applied between the first light-transmissive conductive film and the second light-transmissive conductive film at the position of the at least one pixel according to the expected focal length comprises selecting a voltage corresponding to the expected focal length from a focal length-voltage mapping table stored in advance.

11. The auto focus method according to claim 9, wherein said acquiring information on eyesight status of a user comprises
   prompting the user to input a presbyopic degree on the display; and
   receiving the presbyopic degree inputted by the user.

12. The auto focus method according to claim 9, wherein said acquiring information on eyesight status of a user comprises:
   displaying options representing different presbyopic degrees on the display for the user to select; and
   receiving the user's selection of one of the options.

13. The auto focus method according to claim 9, wherein said acquiring information on posture of the user comprises:
   acquiring the user's current face image through a camera device on the display and then further identifying distance and direction of the user's eyes relative to the display.

* * * * *